(12) United States Patent
Dey

(10) Patent No.: US 12,250,443 B2
(45) Date of Patent: Mar. 11, 2025

(54) IMAGING SYSTEMS AND METHODS FOR DATA-DRIVEN APPARATUS INSPECTION

(71) Applicant: Honeywell International Inc., Charlotte, NC (US)

(72) Inventor: Pradeep Dey, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 13 days.

(21) Appl. No.: 18/202,048

(22) Filed: May 25, 2023

(65) Prior Publication Data
US 2024/0340517 A1 Oct. 10, 2024

(30) Foreign Application Priority Data
Apr. 10, 2023 (IN) .............................. 202311026522

(51) Int. Cl.
| | | |
|---|---|---|
| *H04N 23/50* | (2023.01) | |
| *G06T 7/00* | (2017.01) | |
| *H04N 7/18* | (2006.01) | |
| *H04N 23/51* | (2023.01) | |
| *H04N 23/54* | (2023.01) | |
| *H04N 23/62* | (2023.01) | |

(52) U.S. Cl.
CPC ......... *H04N 23/555* (2023.01); *G06T 7/0008* (2013.01); *H04N 7/183* (2013.01); *H04N 23/51* (2023.01); *H04N 23/54* (2023.01); *H04N 23/62* (2023.01); *G06T 2207/30164* (2013.01)

(58) Field of Classification Search
CPC ...... H04N 23/555; H04N 7/183; H04N 23/51; H04N 23/54; H04N 23/62; G06T 7/0008; G06T 2207/30164
See application file for complete search history.

(56) References Cited

U.S. PATENT DOCUMENTS

| | | |
|---|---|---|
| 10,197,473 B2 | 2/2019 | Diwinsky et al. |
| 10,914,191 B2 | 2/2021 | Finn et al. |
| 11,579,046 B2 | 2/2023 | Pulisciano et al. |
| 2015/0036150 A1* | 2/2015 | Kobayashi ......... A61B 1/00188 356/614 |
| 2015/0300199 A1 | 10/2015 | Rosenkrans et al. |

(Continued)

FOREIGN PATENT DOCUMENTS

| | | |
|---|---|---|
| CN | 110823907 A | 2/2020 |
| CN | 112730439 A | 4/2021 |
| CN | 115015270 A | 9/2022 |

*Primary Examiner* — Nam D Pham
(74) *Attorney, Agent, or Firm* — ALSTON & BIRD LLP

(57) ABSTRACT

Systems and methods for imaging are provided. For example, a system may include an imaging probe that comprises a housing, an imaging portion comprising a camera, and a processor. The housing may be mountable to an inspection window of an apparatus, providing a view into an interior portion of the apparatus with one or more rotatable components therein. The imaging portion may be (a) extendable out of the housing and into the interior portion of the apparatus such that the camera are positioned within the interior portion of the apparatus and (b) retractable into the housing such that the camera are not positioned within the interior portion of the apparatus. The processor may automatically extend and retract the imaging portion and capture a plurality of images of the one or more rotatable components when the imaging portion is extended.

20 Claims, 13 Drawing Sheets

(56) References Cited

U.S. PATENT DOCUMENTS

| | | | |
|---|---|---|---|
| 2016/0178532 A1* | 6/2016 | Lim | G01N 21/9515 |
| | | | 348/46 |
| 2020/0182392 A1* | 6/2020 | Bronnert | H04N 23/56 |
| 2022/0082473 A1 | 3/2022 | Peters et al. | |
| 2023/0132178 A1* | 4/2023 | Kriegl | G02B 23/2492 |
| | | | 73/112.05 |
| 2024/0024047 A1* | 1/2024 | Gerboni | A61B 90/37 |

* cited by examiner

IMAGING SYSTEMS AND METHODS FOR DATA-DRIVEN APPARATUS INSPECTION

CROSS-REFERENCE TO RELATED APPLICATIONS

This application claims priority to and the benefit of foreign India Patent Application Serial No. 202311026522, filed on Apr. 10, 2023 and entitled "Imaging Systems and Methods for Data-Driven Apparatus Inspection," which is incorporated herein by reference in its entirety.

TECHNOLOGICAL FIELD

Example embodiments of the present disclosure relate generally to inspecting apparatuses and, more particularly, to imaging systems and methods for inspecting apparatuses.

BACKGROUND

Gas turbine engines have a number of complex components that require periodic inspection. The inspection is generally performed in an attempt to minimize the likelihood of a catastrophic event associated with such a component.

Applicant has discovered problems with current implementations of inspection systems and methods. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein provide improvements in imaging systems and methods for inspection. Other implementations for imaging systems and methods for inspection will be, or will become, apparent to one with skill in the art upon examination of the following figures and detailed description. It is intended that all such additional implementations be included within this description be within the scope of the disclosure and be protected by the following claims.

In accordance with a first aspect of the disclosure, an imaging system is provided. In at least one example embodiment, an example imaging system includes at least an imaging probe that comprises a housing, an imaging portion, and a processor. The housing is mountable to an inspection window of an apparatus, the inspection window providing a view into an interior portion of the apparatus with one or more components therein. The imaging portion comprises a camera. The imaging portion is (a) extendable at least partially out of the housing and into the interior portion of the apparatus to position the camera within the interior portion of the apparatus and (b) retractable from the interior portion of the apparatus to remove the camera from within the interior portion of the apparatus. The processor automatically controls extension and retraction of the imaging portion and controls capturing a plurality of images of the one or more components using the imaging portion when the imaging portion is extended.

In some embodiments, the processor controls automatic extension of the imaging portion during shutdown of the apparatus.

In some embodiments, the one or more components comprise one or more rotatable components.

In some embodiments, the processor controls automatically extending the imaging portion when the apparatus has been switched off and the one or more rotatable components have a rotational speed that is decreasing and is below a predetermined threshold rotational speed.

In some embodiments, the processor controls automatically retracting the imaging portion after a predetermined amount of time has lapsed since the apparatus has been switched off.

In some embodiments, the processor controls selectively extending and/or retracting the imaging portion based on user input.

In some embodiments, the processor controls automatically transmitting the captured plurality of images to a probe monitoring device and the probe monitoring device comprises a monitoring device processor for (a) receiving the plurality of images from the imaging probe, (b) analyzing the plurality of images using a data model to identify damage to the one or more components, and (c) generating a report indicating a presence or absence of identified damage to the one or more components.

In some embodiments, the imaging portion further comprises a light.

In some embodiments, the apparatus is an engine on an aircraft, the one or more components comprise a plurality of turbine blades, and the processor automatically extends the imaging portion when one or more of (a) an operating engine is cut-off by throttle of the aircraft and/or an engine cutoff switch of the aircraft, (b) the plurality of turbine blades has a rotational speed that is decreasing and is below a predetermined threshold rotational speed, and (c) a weight-on-wheels switch of the aircraft is activated.

In some embodiments, the processor controls automatically retracting the imaging portion if the imaging portion is extended and (a) after a predetermined amount of time has lapsed since the aircraft engine has been switched off or (b) when the throttle of the aircraft is at an idle position and the engine start switch of the aircraft is in an on position.

In accordance with another aspect of the disclosure, a method for imaging one or more components within an interior portion of an apparatus using an imaging probe mounted to an inspection window of the apparatus is provided. The inspection window provides a view into the interior portion of the apparatus. In some embodiments, the method comprises automatically extending, at least partially, an imaging portion of the imaging probe out of a housing of the imaging probe and into the interior portion of the apparatus such that a camera and a light of the imaging portion are positioned within the interior portion of the apparatus; automatically capturing, by the camera of the imaging portion, a plurality of images of the one or more components when the imaging portion is extended; and automatically retracting, at least partially, the imaging portion into the housing such that the camera and the light are not positioned within the interior portion of the apparatus.

In accordance with yet another aspect of the disclosure, an example computer program product is provided. The example computer program product includes at least one non-transitory computer-readable storage medium having computer program code stored thereon that, in execution with at least one processor, configures the at least one processor to perform any one of the example methods described herein.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

Figure 1:
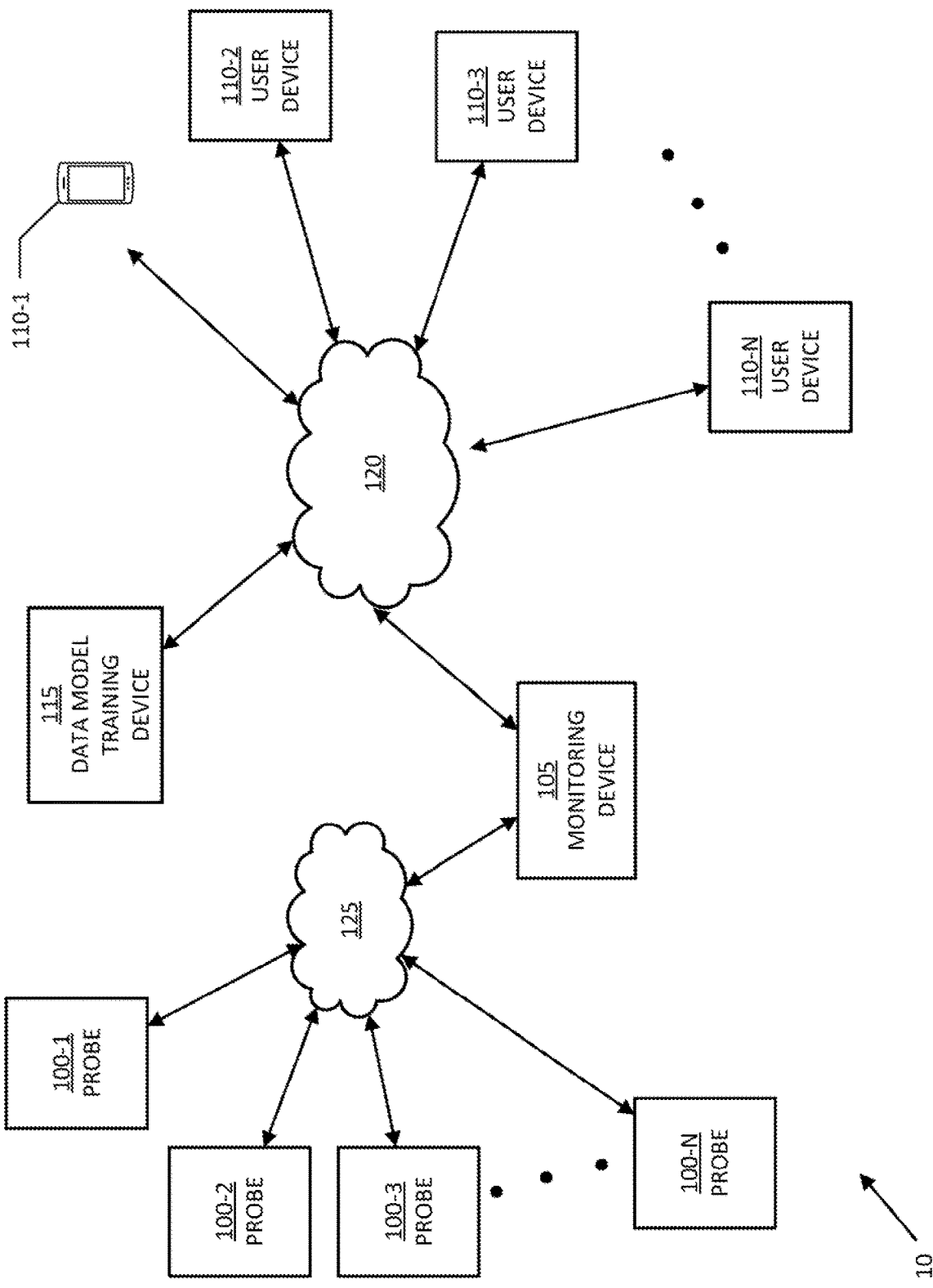
Figure 2:
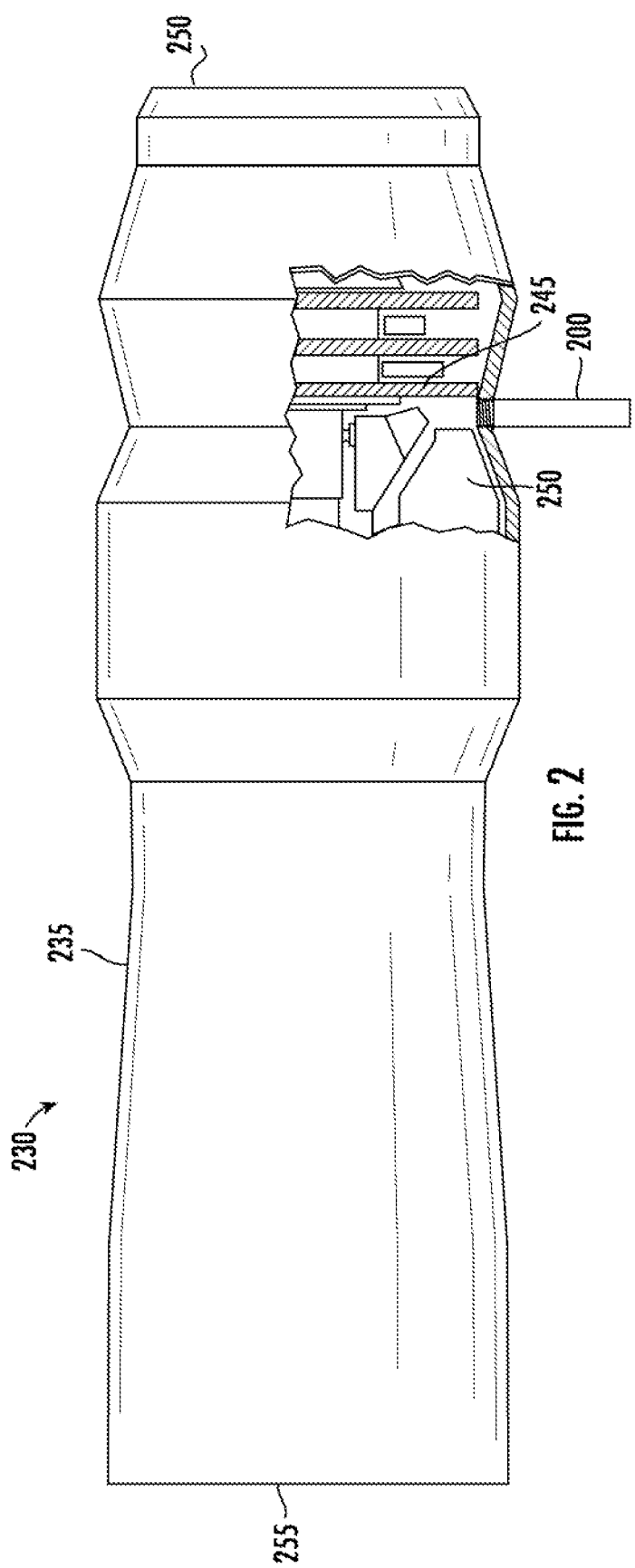
Figure 3:
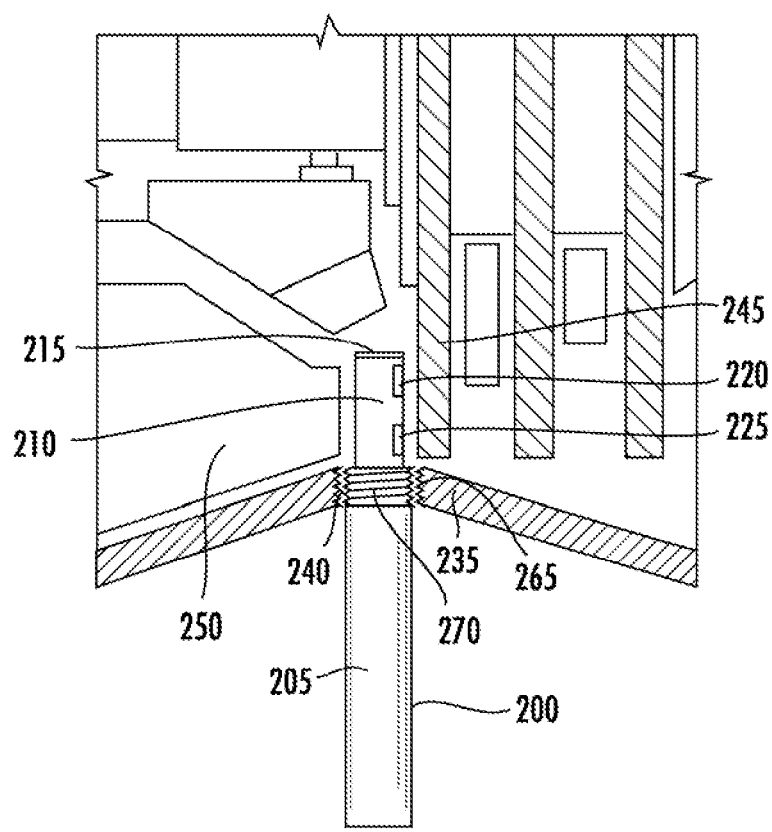
Figure 4A:
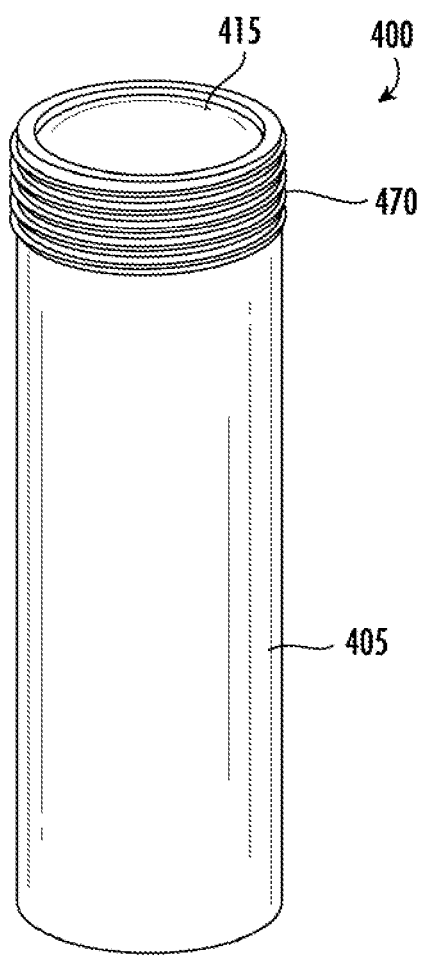
Figure 4B:
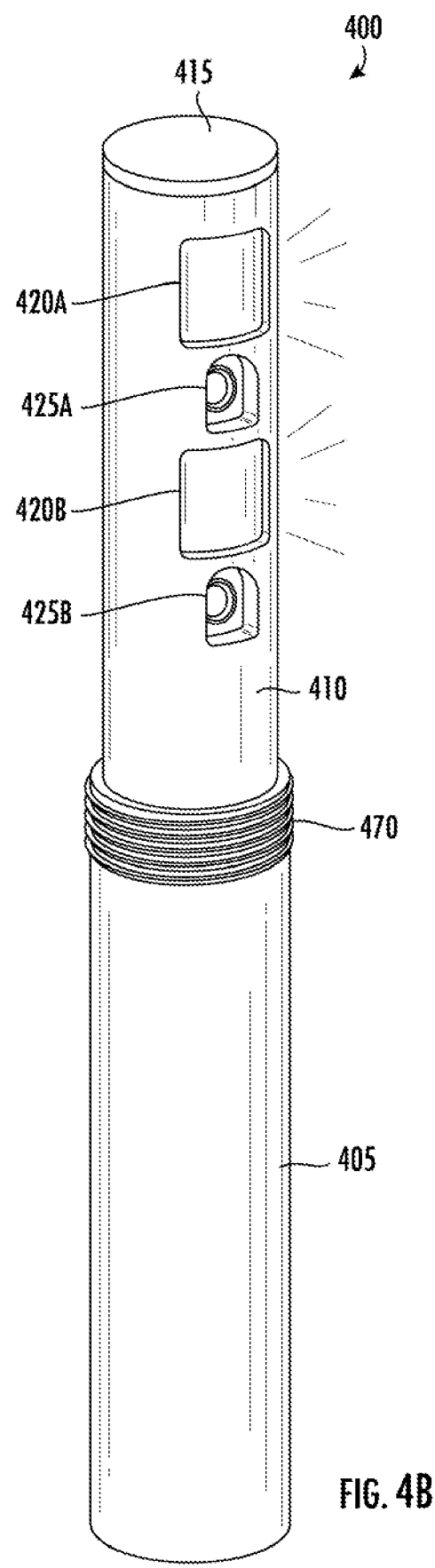
Figure 5:
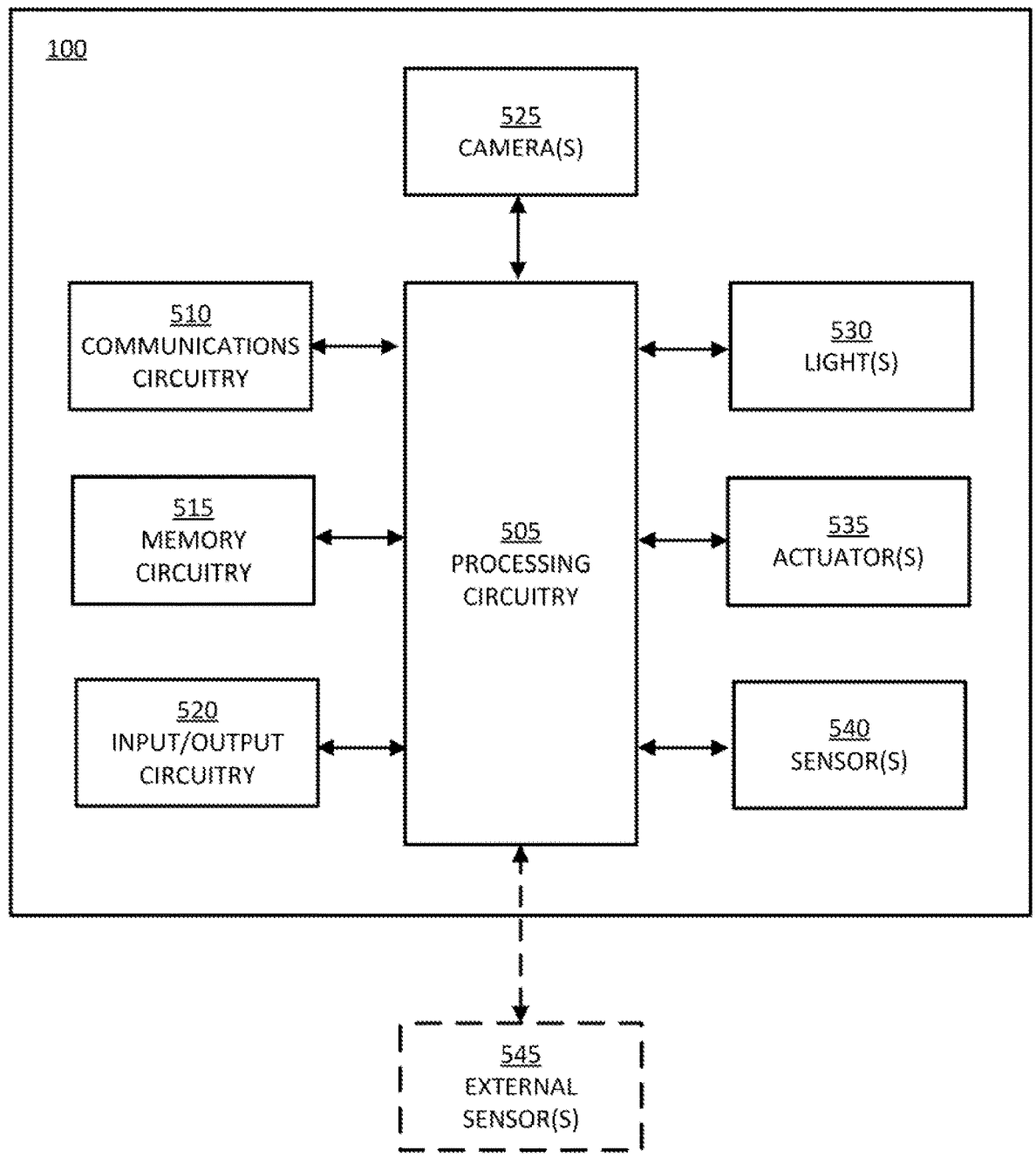
Figure 6:
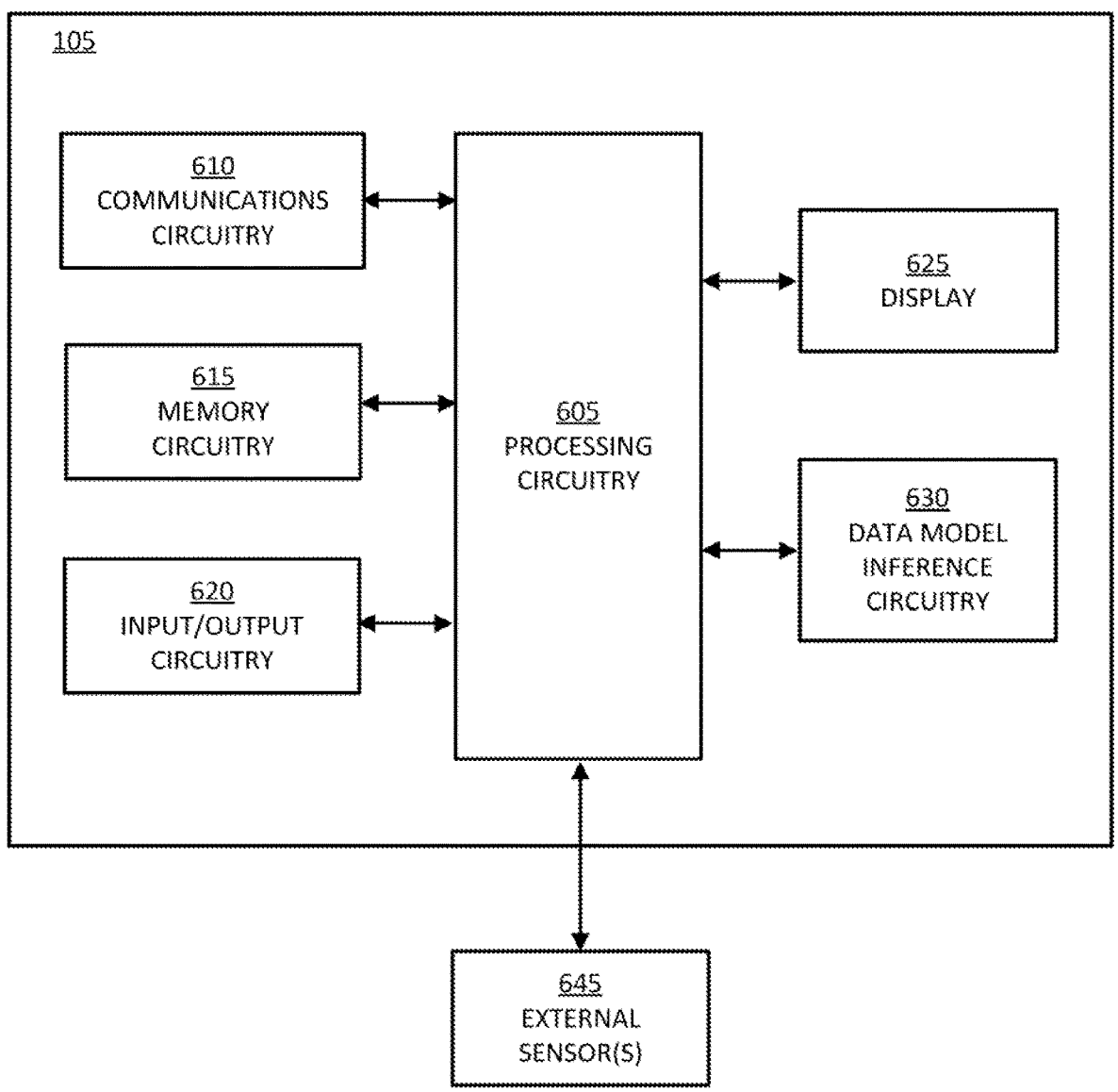
Figure 7:
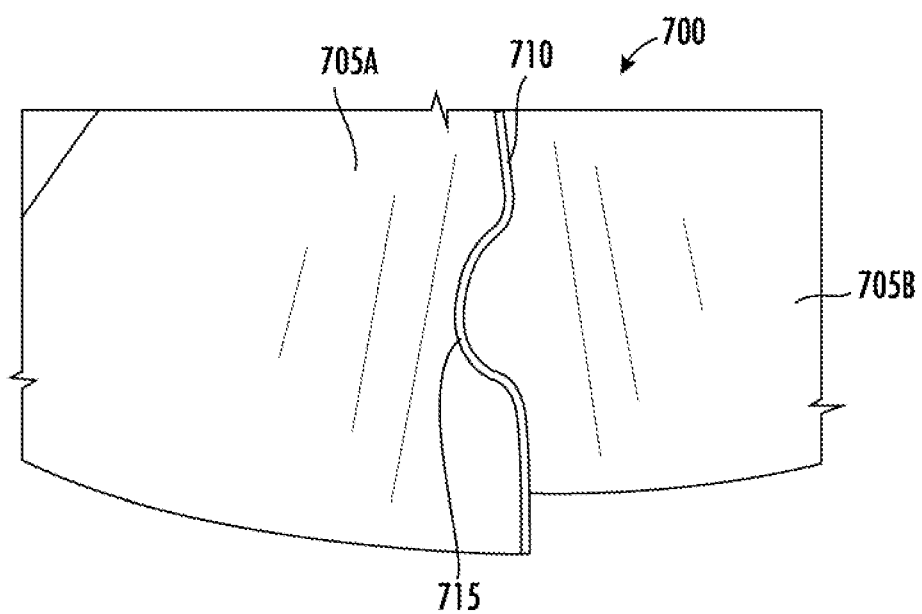
Figure 8:
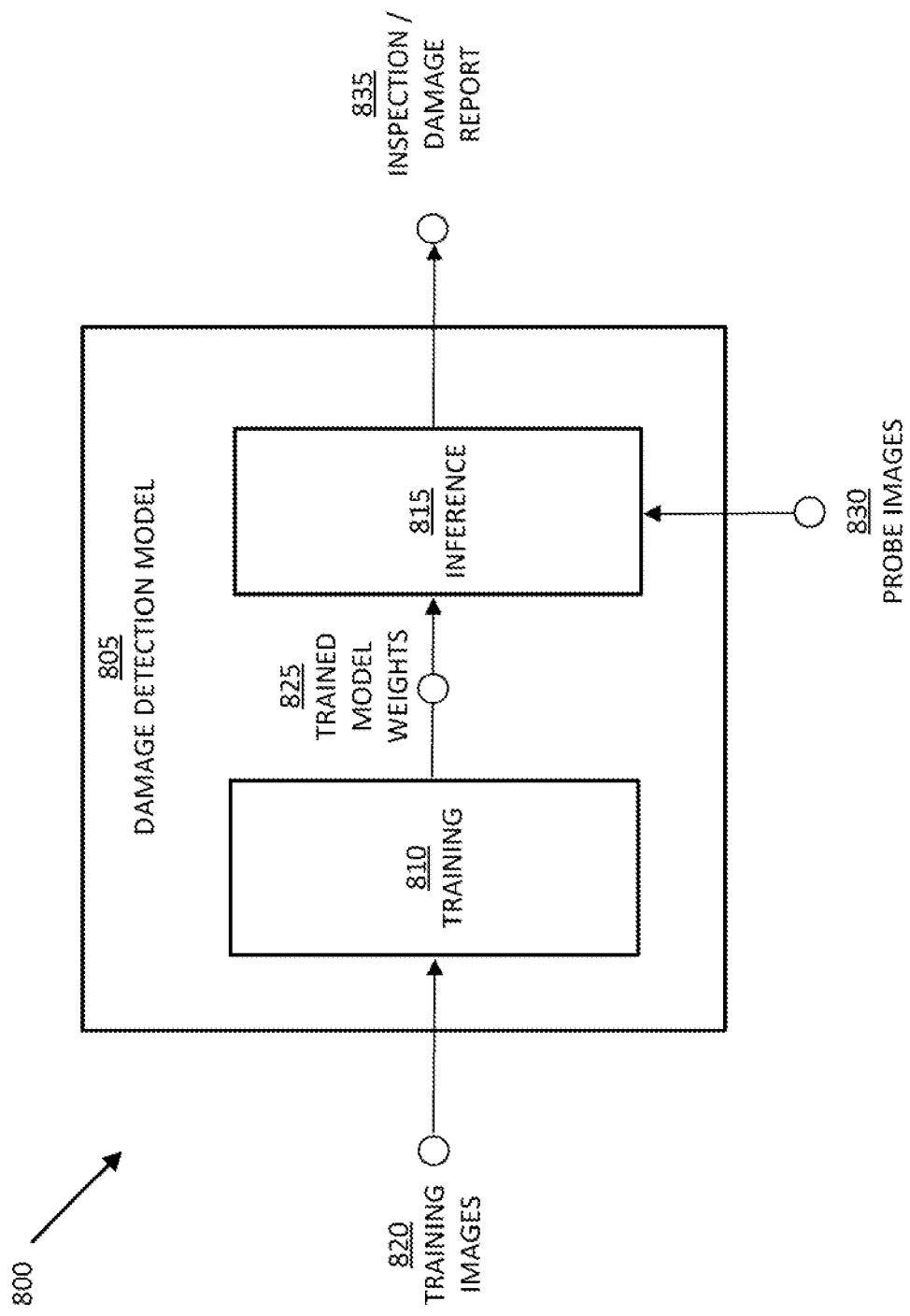
Figure 9A:
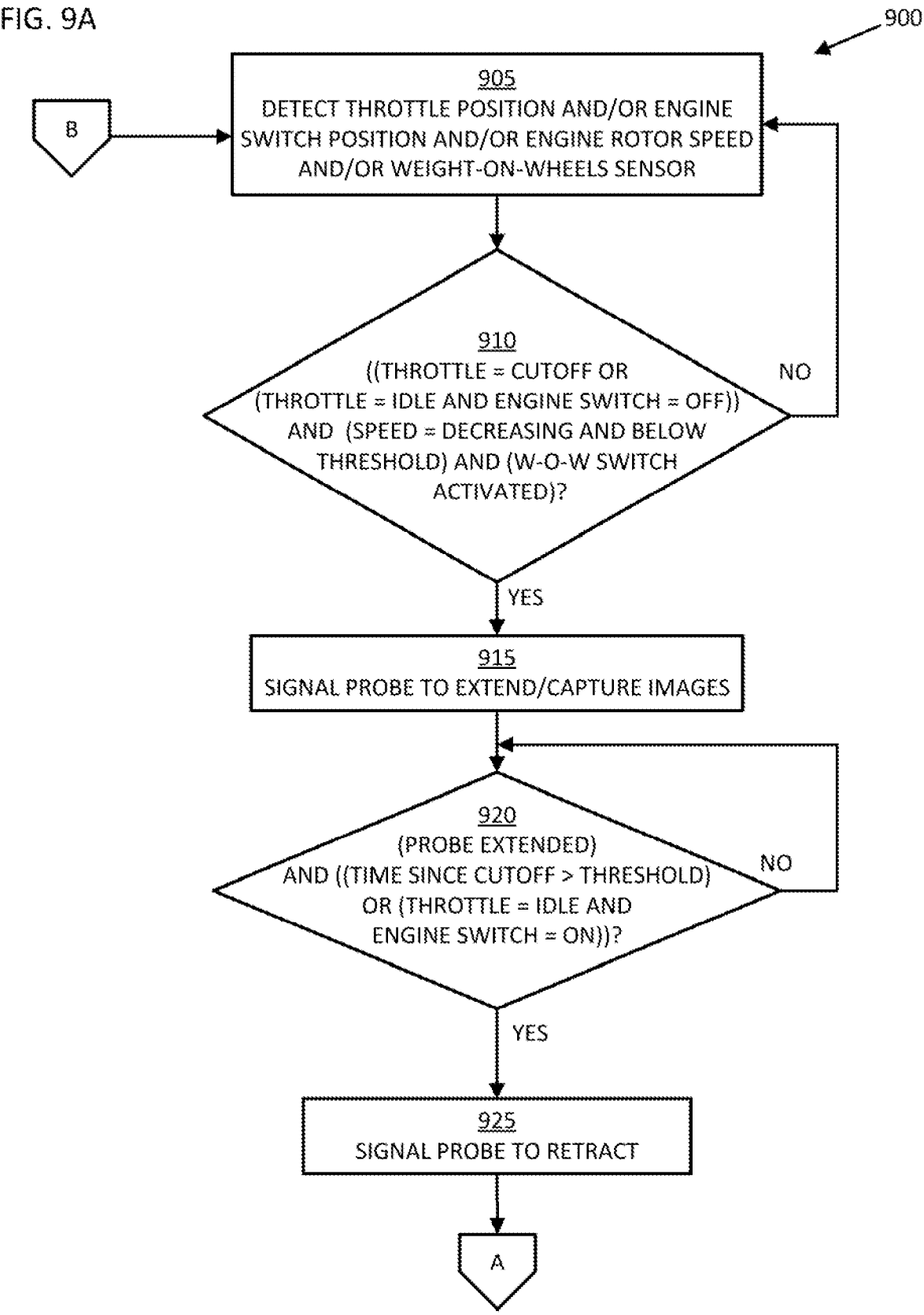
Figure 9B:
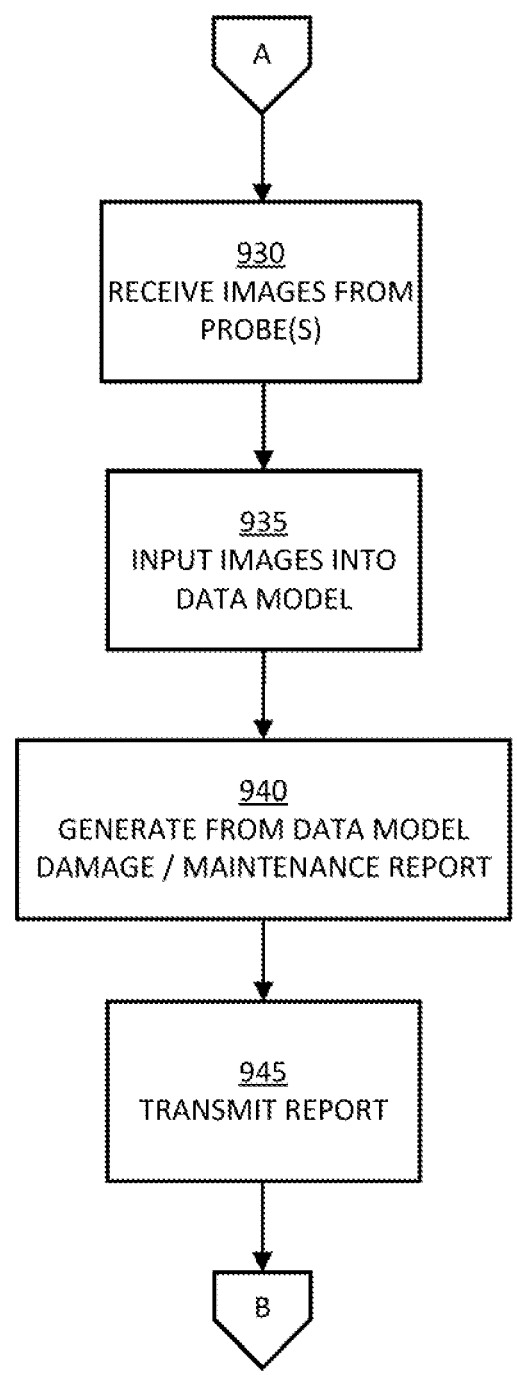
Figure 10:
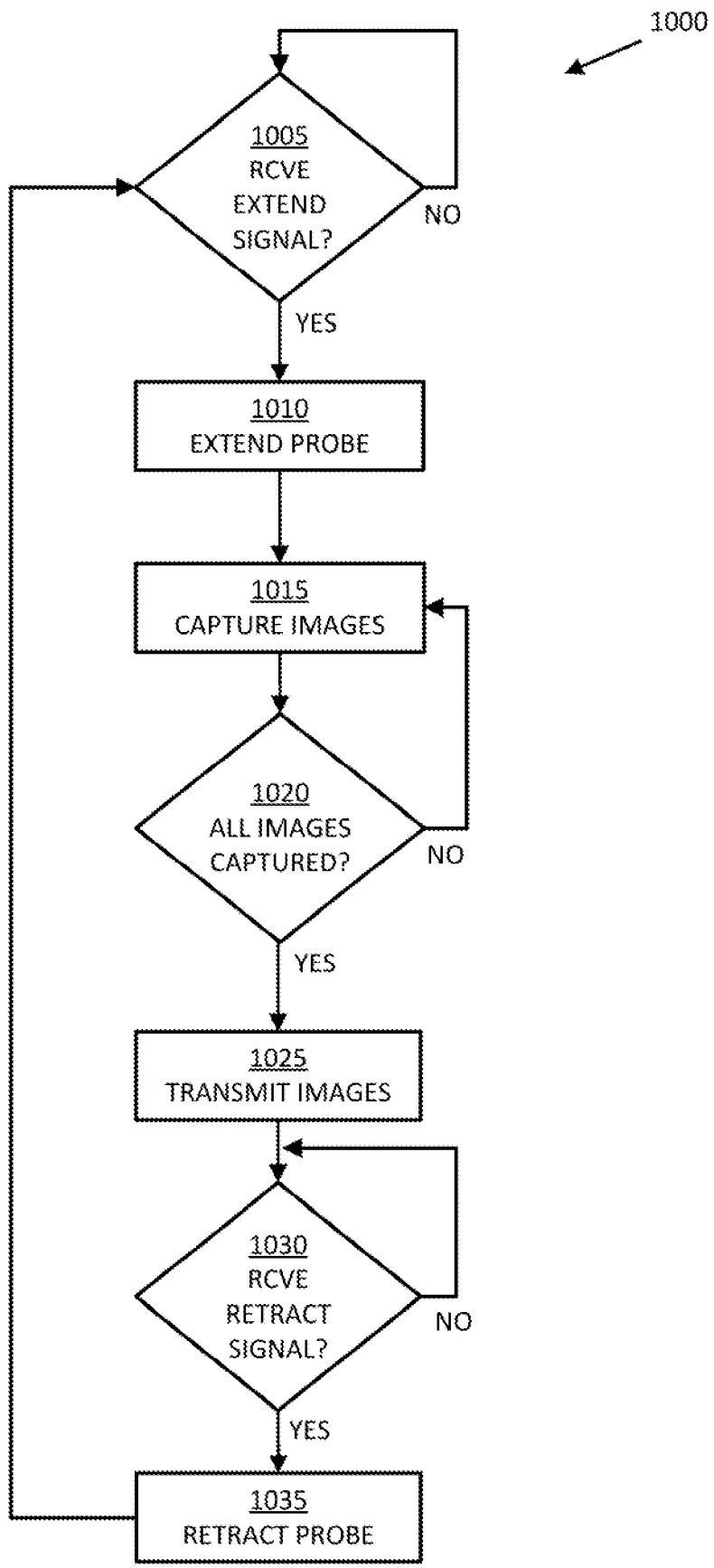
Figure 11:
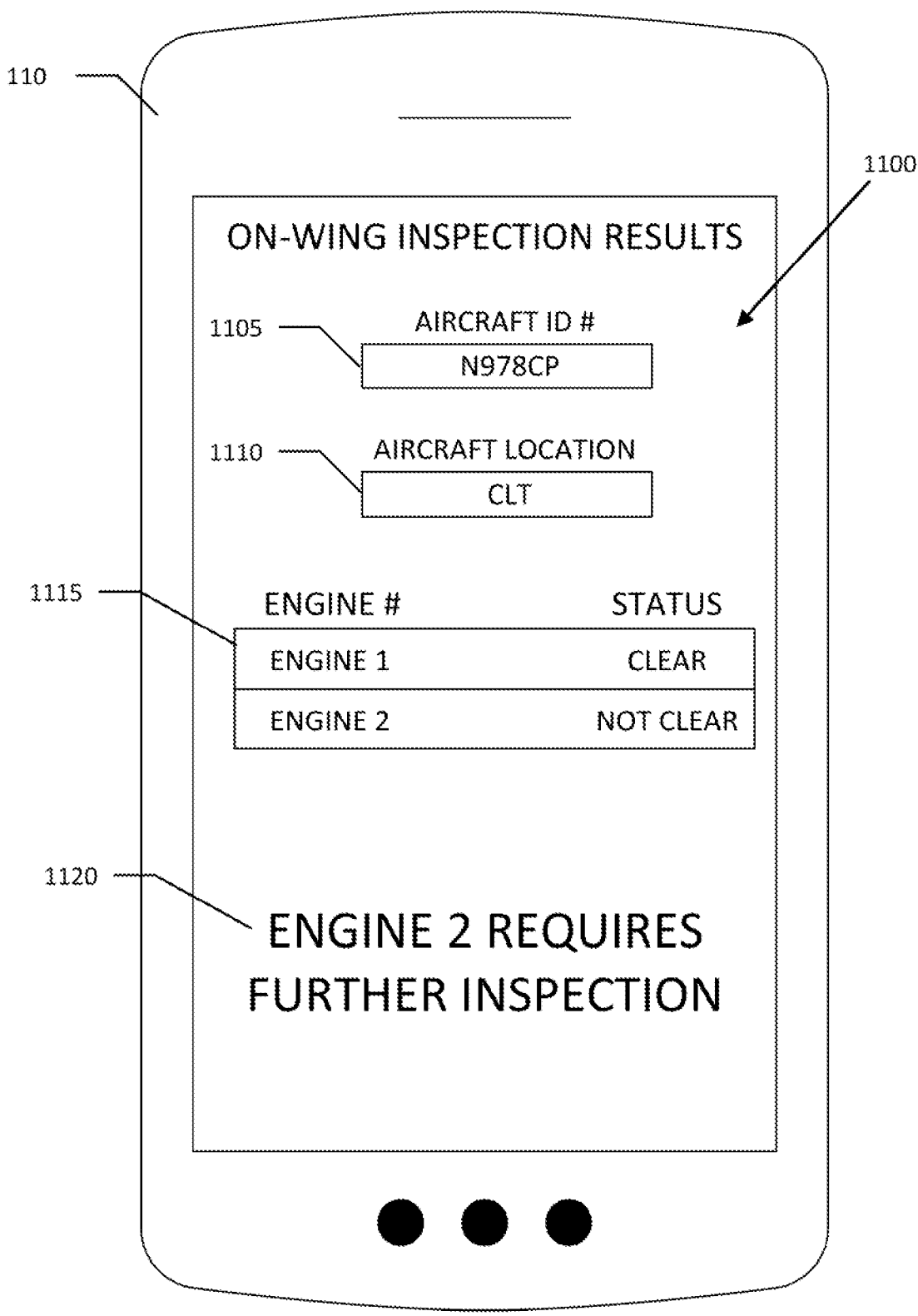

Having thus described the embodiments of the disclosure in general terms, reference now will be made to the accompanying drawings, which are not necessarily drawn to scale, and wherein:

FIG. 1 illustrates a block diagram of an example imaging system within which embodiments of the present disclosure may operate, in accordance with some embodiments of the present disclosure;

FIG. 2 is a partial cutaway side view of an example gas turbine engine showing an example imaging probe in place, in accordance with some embodiments of the present disclosure;

FIG. 3 is a close-up of the partial cutaway side view of the example gas turbine engine and example imaging probe of FIG. 2;

FIGS. 4A and 4B are, respectively, a perspective view and a side view of an example imaging probe in, respectively, a retracted arrangement and an extended arrangement, in accordance with some embodiments of the present disclosure;

FIG. 5 illustrates a block diagram of an example imaging probe that may be specially configured in accordance with an example embodiment of the present disclosure;

FIG. 6 illustrates a block diagram of an example probe monitoring device that may be specially configured in accordance with an example embodiment of the present disclosure;

FIG. 7 is an example image of example turbine blades that may be captured by an example imaging probe, in accordance with some embodiments of the present disclosure;

FIG. 8 illustrates a visualization of an example computing environment for damage detection using a data model, in accordance with at least some example embodiments of the present disclosure;

FIGS. 9A and 9B illustrates a flowchart including operational blocks of an example process for imaging and image analysis, in accordance with at least some example embodiments of the present disclosure;

FIG. 10 illustrates a flowchart including operational blocks of an example process for imaging, in accordance with at least some example embodiments of the present disclosure; and FIG. 11 illustrates an example user interface providing inspection result information, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," "bottom," "left," "right," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "example" or "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "component" may refer to an article, a device, or an apparatus that may comprise one or more surfaces, portions, layers and/or elements. For example, an example component may comprise one or more substrates that may provide underlying layer(s) for the component and may comprise one or more elements that may form part of and/or are disposed on top of the substrate. In the present disclosure, the term "element" may refer to an article, a device, or an apparatus that may provide one or more functionalities.

A gas turbine is a type of continuous flow internal combustion engine. The main parts which are common to all gas turbine engines and which form the power-producing part are, in the direction of flow: a rotating gas compressor, a combustor, and a turbine. Gas turbines are used to power aircraft, trains, ships, electrical generators, pumps, gas compressors, tanks, etc.

Significant lost revenue is typically incurred when a gas turbine is out of service. As such, owners/operators of such gas turbines seek maintenance and repair strategies to minimize downtime while ensuring safe operation. This is particularly important for gas turbine engines on aircraft.

Gas turbine engines have a number of complex components that require periodic inspection. Turbine blades are one such engine component that are inspected periodically for signs of, for example, cracking or deterioration. For example, gas turbine engines installed on aircraft are periodically inspected using a technique known as a borescope inspection. Borescope inspections typically involve the insertion of a viewing apparatus, a borescope, from the engine exterior, through an access port to some interior portion of the engine. However, borescope inspections for on-wing engine blades may have a downtime of up to twelve hours, as such inspections typically involve taking the aircraft to a maintenance hangar, removing the engine cowlings and borescope ports, setting up the borescope, attaching a rotor rotation drive to rotate the turbine blades, and performing manual inspection and analysis. Additionally, the accuracy and thoroughness of such a borescope inspection and analysis is dependent on the skill and experience of the technician performing the borescope inspection.

Examples of other aircraft and aeronautic structures that need regular inspections include undercarriage strut welded joints, wing fuselage joints, flap tracks, and aero engine nozzles and actuators.

Embodiments of the present disclosure provide for an imaging probe that is mounted to an apparatus (such as, for example, a gas turbine aircraft engine) and stays in place during operation of the apparatus. As the imaging probe stays in place during operation of the apparatus, the imaging probe may be referred to as an on-board imaging probe.

In some embodiments, the imaging probe is mounted to a borescope inspection window of the apparatus. Upon shutdown of the apparatus, an imaging probe of example embodiments of the present disclosure automatically captures images of one or more components, such as via one or more mini/micro cameras with one or more light sources to capture high resolution images/videos. In some embodiments, the imaging probe transmits the images/video to a device that is nearby (for example, mounted on the same aircraft, in which case it may be termed an in-situ device) where the images are analyzed using a machine/deep learning module to detect possible damage and/or maintenance issues. In some embodiments, reports are produced and provided to one or more relevant people/departments/companies, indicating the detection or non-detection of such possible damage and/or maintenance issues.

In some embodiments, the imaging probe of embodiments of the present disclosure is mounted to an apparatus in which the component(s) to be imaged/inspected is/are in an area that is hazardous and could damage such a probe if the probe remains in that area during operation of the apparatus. For example, in some embodiments the imaging probe of embodiments of the present disclosure is mounted to a gas turbine aircraft engine to inspect turbine blades in an interior portion of the gas turbine aircraft engine. However, during operation of such a gas turbine aircraft engine, the interior portion where the turbine blades are located contains extremely hot gases that would likely damage such an imaging probe within that interior portion. Also, the presence of such an imaging probe in the interior portion during operation may affect the gas turbine aircraft engine performance.

To prevent such damage and/or effect on performance, an imaging probe of example embodiments of the present disclosure has an imaging portion that is extendable and retractable from a main housing portion. In some embodiments, the imaging portion is retracted during operation of the apparatus such that little or none of the imaging portion extends into a hazardous area of the apparatus. In some embodiments, when the apparatus is not operating, such as during shutdown, the imaging portion is automatically extended into such an area which is no longer hazardous during to image/inspect one or more components therein. In some embodiments, when the imaging is complete, the imaging portion is automatically retracted to allow subsequent operation of the apparatus.

In some embodiments, the imaging portion could also be manually extended into and retracted from the interior portion of an inoperative or fully shutdown apparatus by maintenance or other personnel. Since such a manual inspection occurs when the apparatus is inoperative or fully shutdown, the maintenance personnel will typically attach a rotor rotation drive to rotate the rotatable components for inspection. In some embodiments, such a manual inspection includes the steps of: attaching a rotor rotation drive, rotating the rotatable components, manually extending the imaging portion, manually triggering image capture, manually retracting the imaging portion, and manually triggering image transfer and analysis.

In example embodiments of the present disclosure, imaging of the components to be inspected is done during shutdown (which may also be termed rundown) of the apparatus, particularly if the components to be inspected are rotatable components such as turbine blades. This is because such rotatable components often need to be rotating during inspection to enable the entirety (or at least more) of the rotatable components to be seen during the inspection. Imaging/inspecting such rotatable components during shutdown eliminates the use of a rotor rotation drive to rotate the rotatable components for inspection.

In some example embodiments of the present disclosure, one or more interlocks are used to ensure that the imaging portion is only extended when it is safe to do so, such as during shutdown and (if the apparatus is an aircraft) when the aircraft is on the ground.

An on-board imaging probe of embodiments of the present disclosure provides for automatic imaging and inspection of components without having to take the apparatus out of service, thereby providing reduced downtime and increased safety and reliability since the imaging and inspection can be performed much more often thereby detecting damage sooner. When no damage or needed maintenance is detected and a "clear" status report is given, the confidence in the engine reliability and structural integrity is increased.

While embodiments of the present disclosure are described herein for mounting to and automatically inspecting gas turbine engines, and in particular gas turbine aircraft engines, imaging probes of embodiments of the present disclosure may be used for inspection of any suitable components on any suitable apparatuses in any suitable environment.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Referring now to the figures, FIG. 1 is an example block diagram of an example system for on-board imaging and inspection in accordance with example embodiments of the present disclosure. FIG. 1 illustrates an example system for on-board imaging and inspection that uses one or more imaging probes, each probe imaging one or more components in one or more apparatuses in one or more vehicles/locations/environments/etc., to detect potential damage to the corresponding one or more components. In the illustrated embodiment, the system for on-board imaging and inspection 10 comprises a plurality of probes 100 in communication with a probe monitoring device 105. In the illustrated embodiment, the probes 100 are labeled 100-1 to 100-N to indicate the potentially varying number of probes.

In one specific example embodiment, the system for on-board imaging and inspection 10 is used for imaging and inspecting turbine blades in gas turbine engines on an aircraft. In such an example embodiment, there is at least one probe 100 mounted to each engine. Thus, in an example embodiment for a two-engine aircraft, the system comprises at least two probes.

In some embodiments, the probe monitoring device 105 receives images from the probes 100, analyzes the images using a data model, and generates reports indicating a presence or absence of identified damage to the components in the apparatus(es) to which the probes 100 are attached.

In some embodiments of a system of embodiments of the present disclosure, there is one monitoring device communicating with multiple probes, as illustrated. In some alternative embodiments, there is one monitoring device associated with each probe.

In some embodiments, the communication between the probes 100 and the probe monitoring device 105 is over communications network 125. In some alternative embodiments, the communications network 125 is omitted and the communication between the probes 100 and the probe monitoring device 105 is over communications network 120.

In the illustrated embodiment, the system for on-board imaging and inspection 10 further comprises a data model training device 115 that uses training images of the same type of components as are being imaged and inspected to train a data model to detect damage to the components being monitored.

In the illustrated embodiment, the system for on-board imaging and inspection 10 further comprises one or more user devices 110. In some embodiments, the one or more user devices 110 are associated with users of the system for on-board imaging and inspection 10. For example, users of the system for on-board imaging and inspection 10 who may wish to use such a user device 110 to view reports generated by the system for on-board imaging and inspection 10 include but are not limited to aircraft flight personnel, airline maintenance personnel, airline dispatch personnel, engine manufacturer personnel, etc. In example embodiments, any suitable number of user devices 110 may be used. In the illustrated embodiment, the user devices 110 are labeled 110-1 to 110-N to indicate the potentially varying number of user devices.

In various embodiments, the probe monitoring device 105 generates and/or transmits a report, message, alert, or indication to a user via a user device 110. Additionally, or alternatively, in some embodiments a user device 110 is utilized by a user to remotely access a probe 100, a probe monitoring device 105, and/or or a data model training device 115. This may be by, for example, an application operating on the user device 110. In some embodiments, a user can access a probe 100, a probe monitoring device 105, and/or or a data model training device 115 remotely, including one or more visualizations, reports, and/or real-time displays.

Referring now to FIGS. 2 and 3, a partial cutaway side view of an example gas turbine engine shows an example imaging probe in place, in accordance with some embodiments of the present disclosure. FIG. 2 illustrates an aircraft gas turbine engine 230 having an outer cover 235. The outer cover 235 defines an inlet 255 and an exhaust 260. Within the outer cover 235, the aircraft gas turbine engine 230 comprises a compressor section (which in some embodiments comprises a low pressure compressor and a high pressure compressor) (not illustrated), a combustion section 250, and a turbine section 245. A portion of the combustion section 250 and the turbine section 245 are visible through the partial cutaway. The turbine section comprises a plurality of rotatable turbine blades.

In accordance with some embodiments of the present disclosure, an example probe 200 is mounted to the aircraft gas turbine engine 230 via a borescope inspection port 240 (which may also be termed an inspection window) that is defined in the outer cover 235. An aircraft gas turbine engine may have multiple borescope inspection ports. The borescope inspection port 240 is positioned to enable a borescope inspection of the turbine section 245 and its turbine blades.

The borescope inspection port 240 has internal threads 265, which conventionally can receive a borescope plug when the borescope inspection port is not in use. In some embodiments, the probe 200 has external threads 270 to enable the probe 200 to be screwed into the borescope inspection port 240.

The example probe 200 illustrated in FIGS. 2 and 3 comprises a housing 205 that is positioned outside of the outer cover 235 when the probe 200 is mounted to the aircraft gas turbine engine 230, except for the portion of the housing having the external threads 270 which resides within the borescope inspection port 240. The aircraft gas turbine engine 230 would be enclosed by an engine cowling (not illustrated), and the housing 205 of the probe 200 would also be enclosed by the engine cowling. In some embodiments, the housing 205 is constructed of a suitably strong material, such as any suitable type of metal or metal alloy.

The example probe 200 further comprises an imaging portion 210 that is retractable (fully or partially) into the housing 205 such that such that little or none of the imaging portion 210 extends into the interior portion of the aircraft gas turbine engine 230 (as seen in FIG. 2), and is extendable (fully or partially) out of the housing 205 such that at least a portion of the imaging portion 210 extends into the interior portion of the aircraft gas turbine engine 230 (as seen in FIG. 3). In some embodiments, the imaging portion 210 is automatically retracted during operation of the aircraft gas turbine engine 230 and after an inspection is completed (as described further below) in preparation for subsequent operation of the aircraft gas turbine engine 230. Retracting the imaging portion prevents the probe from being damaged by hot gases during operation of the aircraft gas turbine engine 230. In some embodiments, the imaging portion 210, and its internal components are constructed of such materials and in such a way as to enable the imaging portion to withstand the temperatures that exists in the interior portion during engine shutdown.

In some embodiments, the imaging portion 210 is automatically extended into the interior portion of the aircraft gas turbine engine 230 during shutdown of the aircraft gas turbine engine 230. Extending the imaging portion into the interior portion of the aircraft gas turbine engine 230 during shutdown enables the probe 200 to capture images of the turbine blades as they rotate/winddown to a stop.

In some embodiments, a heat-resistant cap 215 is affixed to or integral with the distal end of the imaging portion 210. The heat-resistant cap 215 helps ensure that the high temperatures in the interior portion of the aircraft gas turbine engine 230 during operation do not damage the probe 200 when the imaging portion 210 is retracted. In some embodiments, the heat-resistant cap 215 is constructed of any suitable material that has a higher resistance to heat than does the material of which the rest of the imaging portion is constructed. In one specific example embodiment, the heat-resistant cap 215 is constructed of titanium.

The example probe 200 illustrated in FIGS. 2 and 3 further comprises a light 220 and camera 225. In some embodiments, when the imaging portion 210 is extended into the interior portion of the aircraft gas turbine engine 230, the light 220 is activated to illuminate the interior portion and the camera 225 is activated to capture a plurality of images and/or video of the rotating turbine blades (or whatever components the probe 200 is set up to image). In some embodiments, the probe comprises more than one light and/or more than one camera.

Referring now to FIGS. 4A and 4B, an example imaging probe in illustrated, in accordance with other embodiments of the present disclosure. FIG. 4A illustrates the example imaging probe in a retracted arrangement, while FIG. 4B illustrates the example imaging probe in an extended arrangement.

The example probe 400 illustrated in FIGS. 4A and 4B comprises a housing 405 that is attachable to an aircraft gas turbine engine or other apparatus via an inspection window, such as a borescope inspection port, by engaging the external threads 470 of the housing 405 with internal threads of the inspection window. In addition, any other suitable mechanism or method may be used to attach a probe of embodiments of the disclosure to an apparatus.

The example probe 400 further comprises an imaging portion 410. In some embodiments, the imaging portion 410 is retractable (fully or partially) into the housing 405 (as seen in FIG. 4A) such that little or none of the imaging portion 410 extends into an interior portion of the apparatus, and is extendable (fully or partially) out of the housing 405 (as seen in FIG. 4B) such that at least a portion of the imaging portion 410 extends into the interior portion of the apparatus. In some embodiments, the imaging portion 410 is automatically extended and automatically retracted, as described further below. In some embodiments, the imaging portion is manually extendable and manually retractable, such as via a user command entered on a user device or by a user activating a selector switch on the probe or monitoring device.

In some embodiments, a heat-resistant cap 415 is affixed to or integral with the distal end of the imaging portion 410. The heat-resistant cap 415 helps ensure that the high temperatures in the interior portion of the apparatus during operation do not damage the probe 400 when the imaging portion 410 is retracted. As illustrated in FIG. 4A, in some embodiments the heat-resistant cap 415 is sized to retract fully into the opening at the threaded end of the housing 405. In some other embodiments, the heat-resistant cap is sized larger than the opening at the threaded end of the housing 405 such that the heat-resistant cap 415 sits against the threaded end of the housing 405 when the imaging portion 410 is retracted. Regardless of the specific structure of the probe and its imaging portion, it is important that there no gas leaks from the gas turbine engine during its operation and when the probe is in its retracted position.

The example probe 400 illustrated in FIGS. 4A and 4B further comprises a first light 420A, first camera 425A, a second light 420B, and a second camera 425B. In some embodiments, the first light 420A and the first camera 425A, respectively, illuminate and image a first portion of the component(s) to be imaged, while the second light 420B and the second camera 425B, respectively, illuminate and image a second portion of the component(s) to be imaged. Additional lights and cameras may be provided in some embodiments as required for complete image capture of the component.

FIG. 5 is an example block diagram of an example probe 100 in accordance with example embodiments of the present disclosure. As described above, the example probe 100 is used for imaging one or more components of an apparatus to detect damage to the components. In the illustrated embodiment, the probe 100 comprises processing circuitry 505, communications circuitry 510, memory circuitry 515, input/output circuitry 520, one or more cameras 525, one or more lights 530, one or more actuators 535, and one or more sensors 540. In some embodiments, the example probe 100 receives signals from one or more external sensors 545.

In an example embodiment, the processing circuitry 505 controls the operation of the probe 100 and its various components, typically according to configuration data and instructional programming stored in the memory circuitry 515 as well as, in some embodiments, control signals from a probe monitoring device as described further below. In an example embodiment, the communications circuitry 510 enables the probe 100 to communicate with the probe monitoring device 105 to receive control signals and to transmit the captured images for analysis. In an example embodiment, the input/output circuitry 520 enables a user to interface with the probe 100, such as to view a status indicator or to manually extend and retract the imaging portion. The example probe 100 may have any suitable number of cameras 525 and lights 530, but typically either one or two of each. If there are more than one camera and/or more than one light, in some embodiments the multiple lights and/or the multiple cameras are aimed differently to illuminate and image different components and/or different portions of components. Any suitable type of camera may be used. In some embodiments, a high definition camera is used to capture sufficient detail of the one or more components being imaged. In some embodiments, the camera(s) 525 comprises one or more imaging sensors including, but are not limited to, a color or monochrome 1D or 2D Charge Coupled Device (CCD), Complementary Metal-Oxide-Semiconductor (CMOS), N-channel Metal-Oxide-Semiconductor (NMOS), P-channel Metal-Oxide-Semiconductor (PMOS), Charge Injection Device (CID) or Charge Modulation Device (CMD) solid state image sensor, and/or the like. Any suitable type of light may be used, including but not limited to light emitting diodes (LEDs).

The example probe 100 may use any suitable type or number of actuators 535 and/or other mechanisms to extend and retract the imaging portion. For example, in some embodiments one or more electromechanical linear actuators extend and retract the imaging portion. In some embodiments, an imaging probe of embodiments of the invention comprises a rotary actuator to rotate the imaging portion. In some embodiments, such a rotary actuator is used for a one-time alignment of the imaging portion during installation and setup of the probe, such that the camera(s) and light(s) are aimed toward the component(s) to be imaged. Alternatively and/or optionally, in some embodiments such a rotary actuator is used during operation of the probe to image different components and/or different parts of a component. In some embodiments, the imaging portion is manually aligned by a user during installation and setup of the probe.

The example probe 100 may have any suitable number and type of sensors 540. For example, in some embodiments the example probe 100 has a sensor to detect whether the imaging portion is extended or retracted. In some embodiments, an indication of whether the imaging portion is extended or retracted is transmitted to a probe monitoring device and/or one or more user devices.

In some embodiments of the invention, the example probe 100 is capable of receiving control signals from a probe monitoring device. In some embodiments, such control signals include a command for the probe to extend its imaging portion, a command for the probe to capture images, a command for the probe to transmit the captured images, and a command for the probe to retract its imaging portion. As described further below, in such embodiments the probe monitoring device receives signals from the apparatus (e.g., a gas turbine aircraft engine) that enable the probe monitoring device to determine when the probe should be extended, when the probe should be retracted, and when the probe should capture images, and to transmit such commands to the probe.

In some alternative embodiments, the example probe 100 is capable of receiving signals from one or more external sensors, switches, etc. 545. For example, in some embodiments the example probe 100 receives a signal indicating the position of a throttle of the aircraft (e.g., cut-off or on), the position of an engine switch of the aircraft (e.g., off or on), the rotational speed of the turbine blades of the aircraft engine (e.g., in revolutions per minute (RPM) and/or as a percentage of the maximum rotational speed of the apparatus), and/or a state of a weight-on-wheels switch of the aircraft (e.g., activated or not activated). In some embodiments, based on one or more of these received signals, the probe 100 determines that the throttle has changed from the on position to the cut-off position and vice versa, when the engine switch has changed from the on position to the off position and vice versa, and/or when the weight-on-wheels switch has changed from being not activated to being activated and vice versa. In some embodiments, the probe 100 keeps track of how much time has elapsed since the throttle has changed from the on position to the cut-off position, since the engine switch has changed from the on position to the off position, and/or since the weight-on-wheels switch has changed from being not activated to being activated. In some embodiments, the probe 100 keeps track of changes in the rotational speed of the turbine blades over time.

FIG. 6 is an example block diagram of an example probe monitoring device in accordance with example embodiments of the present disclosure. The example probe monitoring device 105 of FIG. 6 communicates with one or more of the probes 100 to send control signals (e.g., a command for the probe to extend its imaging portion, a command for the probe to capture images, a command for the probe to transmit the captured images, and a command for the probe to retract its imaging portion) and to receive images (which may include still images and/or video) of the components being inspected from the probe, such as via a hardwired connection or any suitable wireless connection. In the illustrated embodiment, the probe monitoring device 105 comprises processing circuitry 605, communications circuitry 610, memory circuitry 615, input/output circuitry 620, a display 625, and data model inference circuitry 630.

In some embodiments, the example probe monitoring device 105 is capable of receiving signals from one or more external sensors, switches, etc. 645 and determining, based on the received signals from the one or more external sensors, switches, etc. 645, whether the imaging portion of one or more probes should be extended or retracted and whether the imaging portion of one or more probes should capture images. For example, in some embodiments the example probe monitoring device 105 receives a signal indicating the position of a throttle of the aircraft (e.g., cut-off or on), the position of an engine switch of the aircraft (e.g., off or on), the rotational speed of the turbine blades of the aircraft engine (e.g., in revolutions per minute (RPM) and/or as a percentage of the maximum rotational speed of the apparatus), and/or a state of a weight-on-wheels switch of the aircraft (e.g., activated or not activated). In some embodiments, based on one or more of these received signals, the probe monitoring device 105 determines that the throttle has changed from the on position to the cut-off position and vice versa, that the engine switch has changed from the on position to the off position and vice versa, and/or that the weight-on-wheels switch has changed from being not activated to being activated and vice versa. In some embodiments, the probe monitoring device 105 keeps track of how much time has elapsed since the throttle has changed from the on position to the cut-off position, since the engine switch has changed from the on position to the off position, and/or since the weight-on-wheels switch has changed from being not activated to being activated. In some embodiments, the probe monitoring device 105 keeps track of changes in the rotational speed of the turbine blades over time, including tracking engine rotational speed rundown below a predefined threshold level.

In an example embodiment, the processing circuitry 605 controls the operation of the probe monitoring device 105 and its various components, typically according to configuration data and instructional programming stored in the memory circuitry 615. In an example embodiment, the communications circuitry 610 enables the probe monitoring device 105 to communicate with the probes 100 to send control signals and to receive captured images, such as via the communications network 125 or communications network 120. In an example embodiment, the processing circuitry 605 can, in conjunction with the data model inference circuitry 630, apply a data model, as described further below, to the received images of the components being inspected to detect components that may be damaged or otherwise need maintenance.

In an example embodiment, the processing circuitry 605 can create a report indicating any identified damage or maintenance needs for the imaged components. In some embodiments, the processing circuitry 605 displays the report of any identified damage or maintenance needs for one or more users to view, such as via display 625. In various examples of the present disclosure, the display 625 may include a liquid crystal display (LCD), a light-emitting diode (LED) display, a plasma (PDP) display, a quantum dot (QLED) display, and/or the like. Additionally or alternatively, in various examples of the present disclosure, such reports and/or alerts related to any identified damage or maintenance needs are transmitted to one or more user devices 110 (e.g., mobile phone or the like) for a user to view. In an example embodiment, the input/output circuitry 620 enables a user to interact with the probe monitoring device 105, such as to initiate a manual mode of turbine blade inspection cycle.

In some embodiments, the processing circuitry 605 transmits the report of any identified damage or maintenance needs to one or more user devices 110.

In some alternative embodiments of the present disclosure, the functionality of the probe monitoring device 105 is incorporated into each of the probes 100 and the probe monitoring device is omitted. In such alternative embodiments, an example probe receives signals from one or more external sensors, switches, etc. (such as are described above) and determines, based on the received signals from the one or more external sensors, switches, etc., whether its imaging portion should be extended or retracted and whether its imaging portion should capture images. In some embodiments, such determinations are made in a similar manner as made by an example probe monitoring device described herein. In such alternative embodiments, an example probe may analyze the images or may transmit the images to a user device or some other device for analysis.

The probes 100 and the probe monitoring device 105 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatuses should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the system for on-board imaging and inspection 10 may provide or supplement the functionality of particular circuitry. For example, in some embodiments the processing circuitry 505, 605 provides processing functionality, the communications circuitry 510, 610 provides network interface functionality, the memory circuitry 515, 615 provides storage functionality, and the like.

In some embodiments, the processing circuitry 505, 605 (and/or co-processor or any other processing circuitry assisting or otherwise associated with the processor) is in communication with, respectively, the memory circuitry 515, 615 via a bus for passing information among components of the apparatus. The processing circuitry 505, 605 may be embodied in a number of different ways and may, for example, include one or more processing devices configured to perform independently. Additionally, or alternatively, the processing circuitry 505, 605 may include one or more processors configured in tandem via a bus to enable independent execution of instructions, pipelining, and/or multi-threading. The use of the term "processing circuitry" may be understood to include a single core processor, a multi-core processor, multiple processors internal to the apparatus, and/or remote or "cloud" processors.

For example, the processing circuitry 505, 605 may be embodied as one or more complex programmable logic devices (CPLDs), microprocessors, multi-core processors, co-processing entities, application-specific instruction-set processors (ASIPs), and/or controllers. Further, the processing circuitry 505, 605 may be embodied as one or more other processing devices or circuitry. The term circuitry may refer to an entirely hardware embodiment or a combination of hardware and computer program products. Thus, the processing circuitry 505, 605 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing circuitry 505, 605 may be configured for a particular use or configured to execute instructions stored in volatile or non-volatile media or otherwise accessible to the processing circuitry 505, 605. As such, whether configured by hardware or computer program products, or by a combination thereof, the processing circuitry 505, 605 may be capable of performing steps or operations according to embodiments of the present disclosure when configured accordingly.

In an example embodiment, the processing circuitry 505, 605 may be configured to execute instructions stored, respectively, in the memory circuitry 515, 615 or otherwise accessible to the processor. Alternatively, or additionally, the processing circuitry 505, 605 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processing circuitry 505, 605 is embodied as an executor of software instructions, the instructions may specifically configure the processor to perform the algorithms and/or operations described herein when the instructions are executed.

In some embodiments, the memory circuitry 515, 615 may further include or be in communication with volatile media (also referred to as volatile storage, memory, memory storage, memory circuitry and/or similar terms used herein interchangeably). In some embodiments, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the memory circuitry 515, 615 may be used to store at least portions of the databases, database instances, database management system entities, data, applications, programs, program modules, scripts, source code, object code, byte code, compiled code, interpreted code, machine code, executable instructions, and/or the like being executed by, respectively, for example, the processing circuitry 505, 605 as shown in FIGS. 5 and 6. Thus, the databases, database instances, database management system entities, data, applications, programs, program modules, scripts, source code, object code, byte code, compiled code, interpreted code, machine code, executable instructions, and/or the like may be used to control certain aspects of the operation of the probes 100, the probe monitoring device 105, and/or the data model training device 115 with the assistance of, respectively, the processing circuitry 505, 605 and operating system.

In some embodiments, the memory circuitry 515, 615 may further include or be in communication with non-volatile media (also referred to as non-volatile storage, memory, memory storage, memory circuitry and/or similar terms used herein interchangeably). In some embodiments, the memory circuitry 515, 615 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the memory circuitry 515, 615 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the memory circuitry 515, 615 may also be embodied as a data storage device or devices, as a separate database server or servers, or as a combination of data storage devices and separate database servers. Further, in some embodiments, memory circuitry 515, 615 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, memory circuitry 515, 615 may encompass one or more data stores configured to store information/data usable in certain embodiments.

In the example as shown in FIGS. 5 and 6, one or more instances of circuitry may be part of the memory circuitry 515, 615. In this example, the term "circuitry" refers to one or more data storage units in the memory circuitry 515, 615 that may store executable computer program instructions. When the executable computer program instructions stored in such circuitry are executed by a processing circuitry (such as, but not limited to, the processing circuitry 505, 605 shown in FIGS. 5 and 6), the executable computer program instructions may cause the processing circuitry to perform one or more functions.

The communications circuitry 510, 610 may be any means such as a device or circuitry embodied in either hardware or a combination of hardware and software that is configured to receive and/or transmit data from/to a network and/or any other device, circuitry, or module in communication with, respectively, the probes 100, the probe monitoring device 105, and/or the data model training device 115. In this regard, the communications circuitry 510, 610 may include, for example, a network interface for enabling communications with a wired or wireless communication network and/or in accordance with a variety of networking protocols described herein. For example, the communications circuitry 510, 610 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of the probes 100 and/or the probe monitoring device 105. In some embodiments, one or more external systems (such as a remote cloud computing and/or data storage system) may also be leveraged to provide at least some of the functionality discussed herein.

FIG. 1 depicts a probe monitoring device 105 in communication with multiple probes 100 and with a data model training device 115. In some embodiments, the probe monitoring device 105, the data model training device 115, and/or the probes 100 are configured to communicate with each other directly or indirectly through direct communication with another device (e.g., a controller). In other embodiments, for example as depicted, the probes 100 and the probe monitoring device 105 are configured to communicate with each other over a communications network 125, while the probe monitoring device 105 and the data model training device 115 are configured to communicate with each other over a communications network 120.

The communications network 120, 125 may embody any of a myriad of network(s) configured to enable communication between two or more computing device(s). In some embodiments, the communications network 120, 125 embodies a private network. For example, the probe monitoring device 105 may be embodied by various computing device(s) on an internal network, such as one or more server(s) of a facility or vehicle (e.g., an aircraft) in communication with the various probes 100 positioned at various locations in the facility or vehicle.

In other embodiments, the communications network 120, 125 embodies a public network, for example the Internet. In some such embodiments, the probe monitoring device 105 and/or the data model training device 115 may embody a remote or "cloud" system that accesses the probes 100 over the communications network 120, 125 from a location separate from the physical location of the probes 100. For example, the probe monitoring device 105 and/or the data model training device 115 may be embodied by computing device(s) of a central headquarters, central monitoring facility, server farm, distributed platform, and/or the like. In some such embodiments, the probe monitoring device 105 and/or the data model training device 115 may be accessed directly (e.g., via a display and/or peripherals operatively engaged with the probe monitoring device 105 and/or the data model training device 115), and/or may be accessed indirectly through use of a client device. For example, in some embodiments, a user may login (e.g., utilizing a username and password) or otherwise access the probe monitoring device 105 and/or the data model training device 115 to access the described functionality with respect to one or more particular facilities.

In some embodiments, the input/output circuitry 520, 620 may be in communication with, respectively, the processing circuitry 505, 605 to provide output to the user and, in some embodiments, to receive an indication of a user input. The input/output circuitry 520, 620 may include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory circuitry 515, 615, and/or the like).

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

Referring now to FIG. 7, an example image of example turbine blades that may be captured by an example imaging probe is illustrated in accordance with some embodiments of the present disclosure. FIG. 7 illustrates an example image 700 of two turbine blades 705A, 705B of an apparatus captured by a probe of embodiments of the present disclosure. As seen in FIG. 7, the turbine blade 705A has an edge 710 that has a damaged portion 715. In some embodiments, example image 700 is transmitted from the probe to a corresponding probe monitoring device. In some embodiments, the probe monitoring device uses a data model to analyze the image 700 and detect the damaged portion 715. In some embodiments, the probe monitoring device would create a report indicating the presence of turbine blade damage in the corresponding apparatus and transmit the report to one or more user devices.

FIG. 8 illustrates a visualization of an example computing environment for image analysis and damage detection using a data model, in accordance with at least some example embodiments of the present disclosure. In this regard, the example computing environments and various data described associated therewith may be maintained by one or more computing devices, such as the data model training device 115 and/or the probe monitoring device 105. The data model training device 115 and/or the probe monitoring device 105 (alone or in combination), for example, may be specially configured via hardware, software, firmware, and/or a combination thereof, to perform the various data processing and interactions described with respect to FIG. 8 to analyze the images captured by the probe(s) and to identify damage to and/or maintenance needs of the component(s) being imaged.

The example computing environment 800 of FIG. 8 comprises one or more data models for identifying damage to and/or maintenance needs of the component(s) being imaged based on training images depicting various types of damage used to train the data model(s). In some embodiments, the damage detection model 805 comprises any suitable data model, including any suitable artificial intelligence deep learning model. In one example embodiment, the damage detection model 805 comprises a Convolutional Neural Network.

The damage detection model 805 has a model training portion 810 and an inference or detection portion 815. In an example embodiment, a set of training images 820 showing many different types and extents of damage to the component(s) to be imaged are input to the model training portion 810 in order to train the damage detection model 805 to identify damage to and/or maintenance needs of the component(s) being imaged. A product of the model training portion 810 are trained model weights 825 that are used by the inference portion 815 of the damage detection model 805.

In some embodiments, after the data model has been trained, images 830 captured by the probe of the component(s) being imaged are input into the inference portion 815 of the damage detection model 805. By receiving the probe images 830, the inference portion 815 of the damage detection model 805 outputs a report 835 detailing any detected damage or maintenance needs of the component(s).

Having described example systems, apparatuses, computing environments, and user interfaces associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. In regard to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIGS. 9A and 9B illustrate a flowchart including operational blocks of an example process for on-board imaging and inspection, in accordance with at least some example embodiments of the present disclosure. Specifically, FIGS. 9A and 9B depict operations of an example process 900 for capturing images of one or more components of an apparatus using an extendable/retractable probe. In some embodiments, the computer-implemented process 900 is embodied by computer program code stored on a non-transitory computer-readable medium of a computer program product configured for execution to perform the computer-implemented method. Alternatively or additionally, in some embodiments, the example process 900 is performed by one or more specially configured computing devices, such as the probe monitoring device 105. In this regard, in some such embodiments, the probe monitoring device 105 is specially configured by computer program instructions stored thereon, for example in the memory circuitry 615 and/or another component depicted and/or described herein, and/or otherwise accessible to the probe monitoring device 105, for performing the operations as depicted and described with respect to the example process 900. In some embodiments, the specially configured probe monitoring device 105 includes and/or otherwise is in communication with one or more external apparatuses, systems, devices, and/or the like, to perform one or more of the operations as depicted and described.

At step/operation 905, a processor (such as, but not limited to, the processing circuitry 605 of the probe monitoring device 105 described above in connection with FIG. 6) detects one or more sensor states, sensor values, and/or switch states or the like (such as, but not limited to, from the external sensors 645 described above in connection with FIG. 6) to determine whether to command one or more probes to automatically extend and begin the process of imaging the one or more components of the apparatus. In an example embodiment, the apparatus is an aircraft gas turbine engine and the components to be imaged are turbine blades that are rotatable within the aircraft gas turbine engine. In some embodiments of such an example embodiment, as illustrated at step/operation 905, the sensor states, sensor values, and/or switch states comprise aircraft throttle position, aircraft engine switch position, engine rotor speed, and/or weight-on-wheels sensor state.

At step/operation 910, a processor (such as, but not limited to, the processing circuitry 605 of the probe monitoring device 105 described above in connection with FIG. 6) determines if the one or more sensor states, sensor values, and/or switch states or the like indicate that the process of imaging the one or more components of the apparatus can begin. Specifically, in the example embodiment of FIGS. 9A and 9B, the processor determines if the aircraft engine throttle is selected in the CUTOFF position or if the aircraft engine throttle is selected in the IDLE position and the aircraft engine switch is selected in the OFF position, if the engine rotor speed is decreasing from a first to a second predetermined threshold in a predetermined amount of time and is below the second predetermined threshold, and if the weight-on-wheels sensor is activated indicating that the aircraft is on the ground. In a specific example embodiment, the engine rotor speed first predetermined threshold is fifteen percent of the maximum rotor speed, the second predetermined threshold is ten percent of the maximum rotor speed, and the predetermined amount of time is ten seconds. In such an example embodiment, these sensor states, sensor values, and/or switch states or the like indicate that the aircraft is on the ground and shutdown of the engines is occurring. As such, the process of imaging the one or more components of the apparatus can begin.

In a conventional borescope inspection, a rotor rotation drive rotates the turbine blades to enable multiple turbine blades to be inspected from a single inspection port. In example embodiments of the present disclosure, imaging the turbine blades during engine shutdown, before the turbine blades rotation come to a stop, allows the complete set of blades to be inspected using a single probe without having to attach a rotor rotation drive.

If it is determined at step/operation 910 that the sensor states, sensor values, and/or switch states or the like indicate that the aircraft is not on the ground, that shutdown of the engines is not occurring or is already complete, or that the engine speed is too high, then the example process 900 returns to step/operation 905 where the processor continues to monitor the one or more sensor states, sensor values, and/or switch states or the like.

If it is determined at step/operation 910 that the sensor states, sensor values, and/or switch states or the like indicate that the aircraft is on the ground, shutdown of the engines is occurring, and therefore the process of imaging the one or more components of the apparatus can begin, the example process 900 proceeds to step/operation 915.

At step/operation 915 a processor (such as, but not limited to, the processing circuitry 605 of the probe monitoring device 105 described above in connection with FIG. 6, in conjunction with the communications circuitry 610), sends a signal to one or more probes to instruct the probe to extend the imaging portion of the probe into the interior portion of the apparatus and to begin imaging of the one or more components. In some embodiments, the imaging portion is extended automatically when the predefined conditions are met (e.g., the aircraft throttle is in the cutoff position, the aircraft engine switch is in the off position, the engine rotor speed is decreasing and below a predetermined threshold, and/or the weight-on-wheels sensor is activated), without any user intervention.

At step/operation 920, a processor (such as, but not limited to, the processing circuitry 605 of the probe monitoring device 105 described above in connection with FIG. 6) determines if imaging portion should be retracted. Specifically, in the example embodiment of FIGS. 9A and 9B, the processor determines if the imaging portion of the probe should be retracted based on whether the imaging portion of the probe is extended and (a) whether a predetermined amount of time has elapsed since engine cutoff and weight-on-wheels was detected or (b) whether the engine is being started with the throttle in the IDLE position and the engine start switch in the ON position. In some embodiments, the detection of the probe being extended and either (a) or (b) would prompt the retraction of the imaging portion of the probe. In some embodiments, the probe comprises a sensor that detects the position (extended or retracted) of the imaging portion and sends this information to the probe monitoring device 105 so that the processor can confirm the position of the imaging portion of the probe as extended before instructing the probe to retract the imaging portion. In a specific example embodiment, the predetermined amount of time since engine cutoff and weight-on-wheels is ten minutes.

If it is determined at step/operation 920 that the predetermined amount of time has not elapsed since engine cutoff was detected, that the throttle is not in the IDLE position, and that the engine START switch is not the ON position (i.e., that the imaging portion of the probe should not yet be retracted), in some embodiments the processor continues to monitor the time since cutoff, the throttle position, and the engine switch position.

If it is determined at step/operation 920 that the predetermined amount of time has elapsed since engine cutoff was detected or that the throttle is in the IDLE position and the engine START switch is the ON position (i.e., that the imaging portion of the probe should be retracted), the example process 900 proceeds to step/operation 925.

At step/operation 925 a processor (such as, but not limited to, the processing circuitry 605 of the probe monitoring device 105 described above in connection with FIG. 6, in conjunction with the communications circuitry 610), sends a signal to one or more probes to instruct the probe to retract the imaging portion of the probe into the housing of the probe. In some embodiments, the imaging portion is retracted automatically when the predefined conditions are met (e.g., the predetermined amount of time has elapsed since engine cutoff was detected, the throttle is in the on position, or the engine switch is the on position), without any user intervention.

At step/operation 930, a processor (such as, but not limited to, the processing circuitry 605 of the probe monitoring device 105 described above, in connection with FIG. 6 in conjunction with the communications circuitry 610) receives the images captured and transmitted by one or more probes.

At step/operation 935, a processor (such as, but not limited to, the processing circuitry 605 of the probe monitoring device 105 described above in connection with FIG. 6) inputs the received images into a data model (such as, but not limited to, the damage detection model 805 described above in connection with FIG. 8).

At step/operation 940, a processor (such as, but not limited to, the processing circuitry 605 of the probe monitoring device 105 described above in connection with FIG. 6, in conjunction with data model inference circuitry 630 and the inference portion 815 of the damage detection model 805 described above in connection with FIG. 8) analyzes the images to detect damage and/or other maintenance issues and generates a report detailing the detected damage and/or other maintenance issues. In some embodiments, the report includes relevant details and images of the component that is damaged and/or needs maintenance. In some embodiments, when no damage or needed maintenance is detected, a "clear" status report is generated.

At step/operation 945 a processor (such as, but not limited to, the processing circuitry 605 of the probe monitoring device 105 described above in connection with FIG. 6, in conjunction with the communications circuitry 610) transmits the report generated at step/operation 940 one or more user devices 110 (e.g., mobile phone or the like) to be displayed for one or more users to view. For example, such users may include but are not limited to aircraft flight personnel, airline maintenance personnel, airline dispatch personnel, engine manufacturer personnel, etc.

In some embodiments, the process 900 returns to step/operation 905 and continuously repeats.

FIG. 10 illustrates a flowchart including operational blocks of an example process for image capture, in accordance with at least some example embodiments of the present disclosure. Specifically, FIG. 10 depicts operations of an example process 1000 for capturing images by one or more extendable/retractable probes of one or more components of an apparatus. In some embodiments, the computer-implemented process 1000 is embodied by computer program code stored on a non-transitory computer-readable medium of a computer program product configured for execution to perform the computer-implemented method. Alternatively or additionally, in some embodiments, the example process 1000 is performed by one or more specially configured computing devices, such as the probe 100. In this regard, in some such embodiments, the probe 100 is specially configured by computer program instructions stored thereon, for example in the memory circuitry 515 and/or another component depicted and/or described herein, and/or otherwise accessible to the probe 100, for performing the operations as depicted and described with respect to the example process 1000. In some embodiments, the specially configured probe 100 includes and/or otherwise is in communication with one or more external apparatuses, systems, devices, and/or the like, to perform one or more of the operations as depicted and described.

At step/operation 1005, a processor (such as, but not limited to, the processing circuitry 505 of the probe 100 described above in connection with FIG. 5) determines if an instruction to extend has been received by the probe from a probe monitoring device (such as, but not limited to, the probe monitoring device 105 described above in connection with FIG. 6).

If it is determined at step/operation 1005 that an instruction to extend has been received by the probe, at step/operation 1010 a processor (such as, but not limited to, the processing circuitry 505 of the probe 100 described above in connection with FIG. 5), in conjunction with the actuator(s) 535, extends the imaging portion of the probe into the interior portion of the apparatus to enable imaging of the one or more components.

At step operation 1015, a processor (such as, but not limited to, the processing circuitry 505 of the probe 100 described above in connection with FIG. 5, in conjunction with the camera(s) 525 and the light(s) 530) illuminates and captures images (still and/or video) of the one or more components.

At step operation 1020, a processor (such as, but not limited to, the processing circuitry 505 of the probe 100 described above in connection with FIG. 5) determines if all of the desired images have been captured. In some embodiments, this is determined by determining how many turbine blades have been imaged and comparing that number to the known number of turbine blades in the apparatus.

If it is determined at step/operation 1020 that not all of the desired images have been captured, the process returns to step/operation 1015 and continues to capture images.

If it is determined at step/operation 1020 that all of the desired images have been captured, the process continues to step/operation 1025. At step/operation 1025, a processor (such as, but not limited to, the processing circuitry 505 of the probe 100 described above in connection with FIG. 5, in conjunction with the communications circuitry 510) transmits the captured images. In some embodiments, the captured images are transmitted to a probe monitoring device (such as, but not limited to, the probe monitoring device 105 described above in connection with FIG. 1).

At step/operation 1030, a processor (such as, but not limited to, the processing circuitry 505 of the probe 100 described above in connection with FIG. 5) determines if an instruction to retract has been received by the probe from a probe monitoring device (such as, but not limited to, the probe monitoring device 105 described above in connection with FIG. 6).

If it is determined at step/operation 1030 that an instruction to retract has been received by the probe, at step/operation 1035 a processor (such as, but not limited to, the processing circuitry 505 of the probe 100 described above in connection with FIG. 5, in conjunction with the actuator(s) 535) retracts the imaging portion of the probe into the housing of the probe.

In some embodiments, the process 1000 returns to step/operation 1005 and continuously repeats.

Referring now to FIG. 11, the example user interface of FIG. 11 is a graphical representation of example inspection results displayed on a user device 110. FIG. 11 illustrates a user interface 1100 showing the inspection results for two engines in field 1115. The identification number of the aircraft on which the two engines are mounted is provided in field 1105, while the location of the aircraft is provided in field 1110. As seen in field 1115, no damage or maintenance issues were found with Engine 1 but damage or a maintenance issue were found with Engine 2. In some embodiments, a user can "click on" Engine 2 in field 1115 to see additional details about the identified damage or maintenance issue, such as the images showing the damage or maintenance issue. Field 1120 provides a more visible alert as to the presence of damage or a maintenance issue.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An imaging system comprising:
   an imaging probe, the imaging probe comprising:
   a housing mountable to an inspection window of an apparatus, the inspection window providing a view into an interior portion of the apparatus with one or more components therein;
   an imaging portion comprising a camera, wherein the imaging portion is (a) extendable at least partially out of the housing and into the interior portion of the apparatus to position the camera within the interior portion of the apparatus and (b) retractable from the interior portion of the apparatus to remove the camera from within the interior portion of the apparatus into the housing; and
   a processor that automatically controls extension and retraction of the imaging portion and controls capturing a plurality of images of the one or more components using the imaging portion when the imaging portion is extended.

2. The system of claim 1, wherein the processor controls automatic extension of the imaging portion during shutdown of the apparatus.

3. The system of claim 1, wherein the one or more components comprise one or more rotatable components.

4. The system of claim 3, wherein the processor controls automatically extending the imaging portion when the apparatus has been switched off and the one or more rotatable components have a rotational speed that is decreasing and is below a predetermined threshold rotational speed.

5. The system of claim 3, wherein the processor controls automatically retracting the imaging portion after a predetermined amount of time has lapsed since the apparatus has been switched off.

6. The system of claim 1, wherein the processor controls selectively extending and/or retracting the imaging portion based on user input.

7. The system of claim 1, wherein the processor controls automatically transmitting the captured plurality of images to a probe monitoring device, the probe monitoring device comprising a monitoring device processor for (a) receiving the plurality of images from the imaging probe, (b) analyzing the plurality of images using a data model to identify damage to the one or more components, and (c) generating a report indicating a presence or absence of identified damage to the one or more components.

8. The system of claim 1, wherein the imaging portion further comprises a light.

9. The system of claim 1, wherein the apparatus is a gas turbine engine on an aircraft, wherein the one or more components comprise a plurality of turbine blades, and wherein the processor automatically extends the imaging portion when one or more of (a) the aircraft engine is at cut-off by a throttle of the aircraft and/or an engine cut off switch of the aircraft, (b) the plurality of turbine blades has a rotational speed that is decreasing and is below a predetermined threshold rotational speed, and (c) a weight-on-wheels switch of the aircraft is activated.

10. The system of claim 9, wherein the processor controls automatically retracting the imaging portion if the imaging portion is extended and (a) after a predetermined amount of time has lapsed since the aircraft engine has been switched off or (b) when the throttle of the aircraft is at an idle position and an engine start switch of the aircraft is in an on position.

11. A method for imaging one or more components within an interior portion of an apparatus using an imaging probe mounted to an inspection window of the apparatus, the inspection window providing a view into the interior portion of the apparatus, the method comprising
   automatically extending, at least partially, an imaging portion of the imaging probe out of a housing of the imaging probe and into the interior portion of the apparatus such that a camera of the imaging portion are positioned within the interior portion of the apparatus;
   automatically capturing, by the camera of the imaging portion, a plurality of images of the one or more components when the imaging portion is extended; and
   automatically retracting, at least partially, the imaging portion into the housing such that the camera are not positioned within the interior portion of the apparatus.

12. The method of claim 11, wherein the imaging portion is automatically extended during shutdown of the apparatus.

13. The method of claim 11, wherein the one or more components comprise one or more rotatable components.

14. The method of claim 13, wherein the imaging portion is automatically extended when the apparatus has been switched off and the one or more rotatable components have a rotational speed that is decreasing and is below a predetermined threshold rotational speed.

15. The method of claim 13, wherein the imaging portion is automatically retracted after a predetermined amount of time has lapsed since the apparatus has been switched off.

16. The method of claim 11, further comprising selectively extending and retracting the imaging portion based on user input.

17. The method of claim 11, further comprising:
analyzing the plurality of images using a data model to identify damage to the one or more components; and
generating a report indicating a presence or absence of identified damage to the one or more components.

18. The method of claim 11, wherein the apparatus is a gas turbine engine on an aircraft;
wherein the one or more components comprise a plurality of turbine blades; and
wherein the imaging portion is automatically extended when one or more of (a) the aircraft engine is at cut-off by throttle of the aircraft and/or an engine cut off switch of the aircraft, (b) the plurality of turbine blades has a rotational speed that is decreasing and is below a predetermined threshold rotational speed, and (c) a weight-on-wheels switch of the aircraft is activated.

19. The method of claim 18, wherein the imaging portion is automatically retracted if the imaging portion is extended and (a) after a predetermined amount of time has lapsed since the aircraft engine has been switched off or (b) when the throttle of the aircraft is at an idle position and an engine start switch of the aircraft is in an on position.

20. A computer program product comprising at least one non-transitory computer-readable storage medium having computer program code thereon that, in execution with at least one processor, is configured for:
automatically extending, at least partially, an imaging portion of an imaging probe out of a housing of the imaging probe and into an interior portion of an apparatus such that a camera of the imaging portion is positioned within the interior portion of the apparatus;
automatically capturing, by the camera of the imaging portion, a plurality of images of one or more components within the interior portion of the apparatus when the imaging portion is extended; and
automatically retracting, at least partially, the imaging portion into the housing such that the camera is not positioned within the interior portion of the apparatus.

* * * * *